Sept. 13, 1960          A. L. SIMONDS          2,952,730

STRAIN RELIEF GROMMET

Filed March 6, 1957          2 Sheets-Sheet 1

INVENTOR.
ALBERT L. SIMONDS

BY
Lindsey and Prutzman
ATTORNEYS

Sept. 13, 1960  A. L. SIMONDS  2,952,730
STRAIN RELIEF GROMMET

Filed March 6, 1957  2 Sheets-Sheet 2

INVENTOR.
ALBERT L. SIMONDS
BY
Lindsey and Prutzman
ATTORNEYS

United States Patent Office 2,952,730
Patented Sept. 13, 1960

2,952,730

STRAIN RELIEF GROMMET

Albert L. Simonds, Woodstock, Conn.

Filed Mar. 6, 1957, Ser. No. 644,261

7 Claims. (Cl. 174—153)

This invention relates to a novel and improved strain relief grommet assembly for use with electrical cords and cables.

It is the primary object of this invention to provide a strain relief grommet assembly for use with an electrical cord and the like having novel and improved means for retaining the cord therein whereby a relatively high tensile load may be placed on the cord without causing displacement or slipping of the cord relative to the grommet and without cutting or otherwise damaging the cord insulation.

It is a further object of this invention to provide a strain relief grommet assembly of the type described which is economical to fabricate and simple to install and which is rugged and will assure an extended service life without failure.

Other objects will be in part obvious, and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
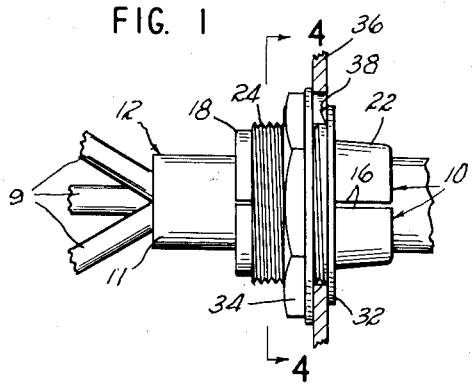
Fig. 1 is a side elevational view, partly in section, of a grommet constructed in accordance with the invention assembled on an electrical cord and engaged in an aperture in a panel.
Figure 2:
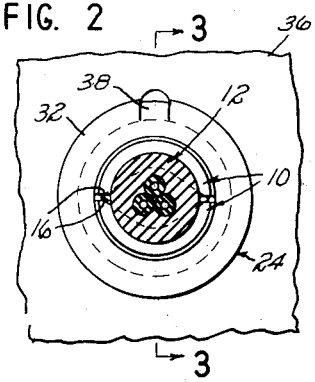
Fig. 2 is an end view of the grommet assembly of Fig. 1.
Figure 3:
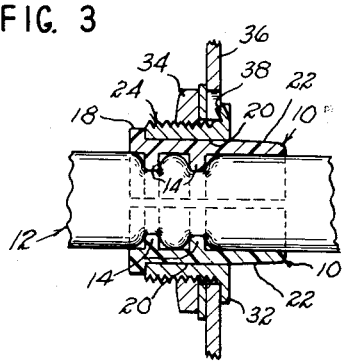
Fig. 3 is a fragmentary cross sectional view along the line 3—3 of Fig. 2.
Figure 4:
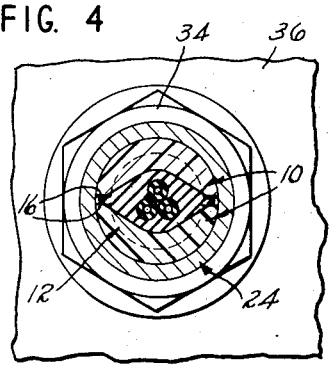
Fig. 4 is a cross sectional view along the line 4—4 of Fig. 1.
Figure 5:
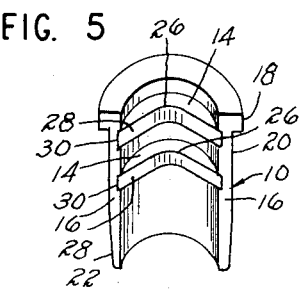
Fig. 5 is a perspective view of one of the elements of the grommet assembly.

With reference to the drawings, and particularly Figs. 1–5, a strain relief grommet assembly constructed in accordance with the invention comprises a pair of generally semi-cylindrical sleeve members 10 which are engageable about an electrical cord 12 which in the illustration of the drawings is of a conventional type including a plurality of electrical conductors 9 surrounded by a resiliently compressible insulating covering 11. The sleeve members 10 are preferably formed from electrically non-conducting and relatively rigid material such as synthetic plastic materials. In the specific embodiment, the sleeve members are formed of nylon, although other suitable materials having similar characteristics could be used.

Each of the sleeve members as shown in the drawings is formed internally with a pair of ribs 14 extending transversely of the sleeve member and terminating at the longitudinal edges 16 of the sleeve member. In the practice of the invention it has been found that at least two ribs 14 are required on each sleeve member, although, if desired, additional ribs may be added. The ribs 14 are spaced apart longitudinally of the sleeve members a distance substantially greater than the width of an individual rib, as can be seen most clearly in Fig. 3. The ribs of one sleeve member register with the ribs of the other sleeve member when the members are clamped upon the cord so that the ribs form a plurality of aligned cord receiving apertures of substantially lesser cross section than the aperture formed by the remainder of the sleeve.

Each sleeve member is provided with a flange 18 extending radially outwardly at one end thereof. The main portion 20 of the sleeve is of substantially constant diameter while the end opposite the flange 18 is externally tapered, as indicated at 22. When the strain relief grommet is assembled on a cord, a collar 24 formed of metal or similarly strong rigid material and having an inner diameter precisely dimensioned for use with the sleeve members is engaged over the sleeve members to clamp the cord between the inner surfaces of the sleeve members and also between the ribs 14. The engagement of the collar with the tapered portion of the sleeve members during assembly forces the ribs 14 into compressing engagement with the compressible outer covering of the cord and causes the covering to bulge outwardly intermediate the ribs, as most clearly shown in Fig. 3, to provide a secure retention of the cord within the grommet. When the collar 24 and sleeve members are completely assembled, the collar is seated on the untapered surface 20 of the sleeve members, thus eliminating a tendency of the collar to become dislodged.

The inner diameter of collar 24 is selected to provide that a predetermined force will be exerted by the ribs 14 on the cord when the collar 24 is engaged with the surface 20 to assure the desired compression of the cord. At the same time, as can be seen from the drawings, it is preferred that the sleeve members be dimensioned so that when they are clampingly engaged on a cord by the collar 24, the longitudinal edges 16 of each member will not touch the longitudinal edges of the other member but will be slightly spaced therefrom so that the outer covering of the cord is firmly clamped between these edges to provide increased retension of the cord and to preclude turning thereof in the grommet. In this connection, each of the ribs 14 is provided with an arcuate center portion 26 and is sloped outwardly as at 28 from the center portion to the longitudinal edges of the sleeve member. This configuration of the ribs assures that when the sleeve members are engaged with the cord with sufficient force the cord will be engaged by the ribs along substantially the full length of the ribs, and further, that the compressible outer covering of the cord will be induced to flow outwardly of the sleeve members and between the longitudinal edges thereof for gripping thereby. It has been found that this desired flow of the cord outer covering is improved and cutting of the cord covering is avoided when the ends of the ribs 14 terminate at a point spaced slightly outwardly of the juncture between the inner surface of the sleeve member and the longitudinal edges thereof, thus forming notches in the longitudinal edges, as at 30.

Test results show that a uniform gripping of the cord covering about substantially its entire periphery by the ribs 14 and the desired gripping of the covering between the longitudinal edges of the sleeve member is best achieved, without any tendency of any sleeve members to cut the covering, when the ribs are inclined outwardly of the center portion 26, thereof, at an angle of approximately 57° to a sleeve member radius extending through the mid-point of the rib.

In the embodiment of Figs. 1–5, the collar 24 is provided with a flange 32 at its end opposite the flanges 18 on the sleeve members and is externally threaded to receive a nut 34, whereby the grommet assembly may be inserted through an aperture in the panel 36 and retained therein by engagement of the panel between the flanges 32 and nut 34. An indented tab 38 is provided on the flange 32 for reception in a recess in the panel to prevent rotation of the grommet assembly relative to the panel.

Figure 6:
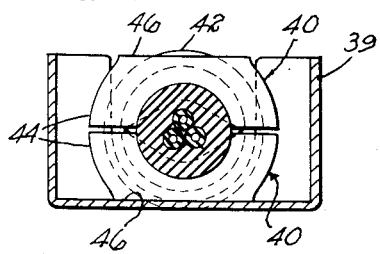
Fig. 6 is an end view, partly in section, of a modified form of the grommet of Fig. 1 assembled on an electrical cord and engaged in a slot in a housing.
Figure 7:
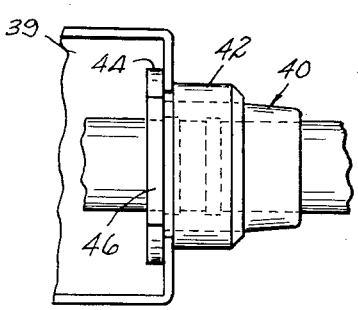
Fig. 7 is a fragmentary top view of the grommet and housing of Fig. 6.

In Figs. 6 and 7, there is shown an alternative form of the grommet assembly heretofore described, adapted for mounting in an open ended slot in a switch housing 39 or the like. The grommet assembly of Figs. 6 and 7 comprises a pair of sleeve members 40 and a collar 42 substantially the same as the sleeve members 10 and collar 24 heretofore described. As shown in Figs. 6 and 7, in this embodiment, the collar 42, when the grommet is assembled, is spaced from the flanges 44 at the end of the sleeve members to provide a groove in which the sides of the slot in the housing is engageable. Further, the flanges 44 are preferably provided with a flat spot 46 which, as shown in Fig. 6, is engageable with the housing 39 to prevent turning of the assembly relative to the housing.

Figure 8:
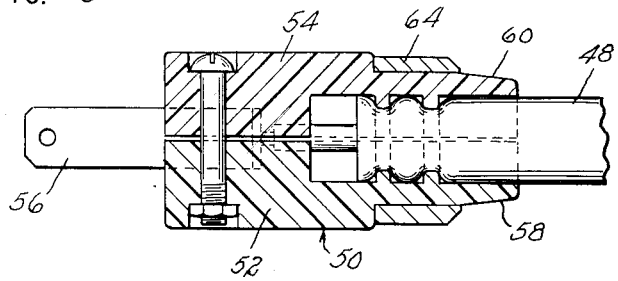
Fig. 8 is a cross sectional view of an electrical connector attached to a cord and incorporating a modified form of the invention.
Figure 9:
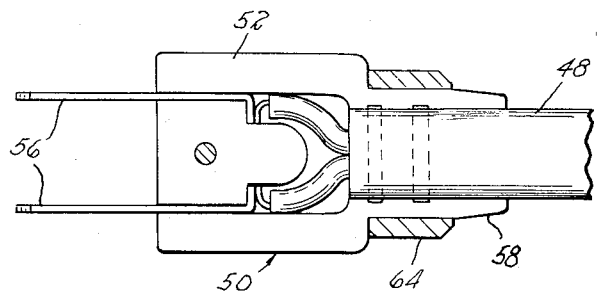
Fig. 9 is a top view, partly in section, of the connector of Fig. 8 with a portion removed.

In Figs. 8 and 9, a further embodiment of the invention is shown in connection with a male plug to which a cord 48 is attached. It should be understood that the plug 50 is shown merely by way of an example of the adaptation of the invention for use with any suitable electrical connector. The plug comprises a pair of housing sections 52, 54, in which is mounted a pair of prongs 56 connected to the ends of a pair of conductors carried by the cord 48. The section 52 has formed integrally therewith, at one end, a semi-cylindrical extension 58 forming a sleeve member. In the specific embodiment shown, a second sleeve member 60, formed by a like extension on the housing section 54, cooperates with the sleeve member 58 to provide a strain relief connection between the cord and plug. The sleeve members 58, 60 are formed substantially the same as the sleeve member 10 heretofore described, and a collar 64, such as the collar 24, maintains the sleeve members in the firm cord gripping engagement heretofore described.

It should be noted that a grommet constructed as described while providing much improved strain relief performance will not damage the outer cord covering, because of the engagement therewith, such as so often occurs with existing strain relief grommets. Further, the grommet is relatively inexpensive to fabricate, yet, as is believed should be obvious, has a substantially indefinite service life even though assembled and disassembled from a cord many times.

I claim:

1. A strain relief grommet for use with an electrical cord and the like having a resiliently compressible outer insulating covering comprising a pair of generally semi-cylindrical sleeve members of relatively rigid material engageable about a cord and having tapered end portions, each sleeve member having a plurality of internal cord engaging ribs spaced apart longitudinally thereof and extending transversely thereof, the ribs on each sleeve member being registrable respectively in spaced relation with the ribs on the other sleeve member when the members are assembled on a cord, and a continuous rigid collar slidably engageable with the tapered end of said sleeve members to compress the insulating covering, said collar being further slidable onto the generally cylindrical portion of the sleeve members to clamp the sleeve members on the cord with the ribs forced into firm gripping engagement with the cord covering.

2. A strain relief grommet for use with an electrical cord and the like having a resiliently compressible outer insulating covering comprising a pair of generally semi-cylindrical sleeve members of relatively rigid material engageable about a cord, each sleeve member being tapered at one end and having a plurality of internal spaced apart cord engaging ribs extending transversely thereof and terminating at the longitudinal edges of the sleeve member, the ribs on each sleeve member being registrable respectively in spaced relation with the ribs on the other sleeve member to form a plurality of cord receiving apertures when the sleeve members are clamped about a cord, and a continuous rigid collar slidable over the tapered end of the sleeve members to force the sleeve members together, said collar being further slidable onto the generally cylindrical portion of the sleeve members to clamp the sleeve members on the cord with the ribs forced into firm gripping engagement with the cord covering.

3. A strain relief grommet for use with an electrical cord and the like having a resiliently compressible outer insulating covering, comprising a pair of generally semi-cylindrical relatively rigid sleeve members tapered at one end engageable about a cord with the longitudinal edges of one sleeve member spaced from the longitudinal edges of the other sleeve member, each sleeve member having a plurality of internal spaced apart cord engaging ribs extending transversely thereof from one longitudinal edge to the other, the ribs of each sleeve member being registrable respectively with the ribs of the other sleeve member and being formed to provide a flow of said insulating covering intermediate the spaced apart longitudinal edges of the sleeve members for gripping thereby when the cord is firmly compressed between said ribs, and a continuous rigid collar slidable over the tapered ends of the sleeve members to force the sleeve members together, said collar being further slidable onto the generally cylindrical portions of the sleeve members to clamp the cord between said ribs and longitudinal edges and force the ribs and longitudinal edges into firm gripping engagement with the cord covering.

4. A strain relief grommet for use with an electrical cord and the like having a resiliently compressible outer insulating covering comprising a pair of generally semi-cylindrical sleeve members of relatively rigid material engageable about a cord with the longitudinal edges of each member spaced respectively from the longitudinal edges of the other member, each sleeve member having a tapered end and a plurality of internal spaced apart ribs extending from one longitudinal edge of the sleeve member to the other end registrable respectively with the ribs of the other sleeve member when the members are clamped on a cord, each of said ribs having a cord engageable arcuate center portion and being inclined inwardly of the respective sleeve member from the longitudinal edges thereof to said center portion whereby the covering of the cord will be forced between the spaced apart longitudinal edges of the sleeve members for gripping engagement thereby when the cord covering is firmly compressed between the sleeve members, and a continuous collar of relatively rigid material slidable over the tapered end of the sleeve members to force the sleeve members together, said collar being further slidable onto the generally cylindrical portion of the sleeve members to clamp said cord covering between the ribs and longitudinal edges of the sleeve members.

5. A strain relief grommet for use with an electrical cord and the like having a resiliently compressible outer insulating covering comprising a pair of generally semi-cylindrical sleeve members of relatively rigid material engageable about a cord with the longitudinal edges of one sleeve member spaced from the longitudinal edges of the other sleeve member, each sleeve member having a tapered end and a plurality of internal spaced apart ribs registrable respectively with the ribs of the other sleeve member when the members are clamped on a cord, each of said ribs having a cord engageable arcuate center portion and being inclined outwardly of said center portion toward the longitudinal edges of the respective sleeve member and terminating at said longitudinal edges intermediate the inner and outer surface of the sleeve member, and a continuous rigid collar slidable over the tapered end of the sleeve members to force the sleeve members together and onto the generally cylindrical portions of the sleeve members and dimensioned to clamp the sleeve members on the cord with the ribs and longitudinal edges forced into firm gripping engagement with the cord covering.

6. A strain relief grommet for use with an electrical cord and the like having a resiliently compressible outer insulating covering comprising a pair of generally semi-cylindrical sleeve members of relatively rigid material engageable about a cord, each sleeve member having a tapered end and a plurality of internal spaced apart ribs extending transversely thereof from one longitudinal edge to the other and registrable respectively with the ribs of the other sleeve member when the members are clamped about a cord to define a plurality of aligned cord receiving apertures of reduced cross section, a continuous rigid collar slidable over the tapered end of the sleeve members to force the sleeve members together and onto the generally cylindrical portion of the sleeve members to force said ribs into firm gripping engagement with the cord covering, said collar having a flange adjacent one end extending radially outwardly thereof, and a member threadably engageable with said collar externally thereof for movement longitudinally thereof toward said flange, whereby the grommet may be secured in an aperture in a panel and the like.

7. A strain relief grommet for use with an electrical cord and the like having a resiliently compressible outer insulating covering comprising a pair of generally semi-cylindrical sleeve members of relatively rigid material engageable about a cord, each sleeve member having one end tapered, a flange extending radially outwardly thereof at the other end, and further having a plurality of internal spaced apart ribs extending transversely thereof from one longitudinal edge to the other and registrable respectively with the ribs of the other sleeve member when the members are clamped about a cord to define a plurality of aligned cord receiving apertures of reduced cross section, a continuous rigid collar slidable over the tapered end of the sleeve members to force the sleeve members together and onto the generally cylindrical portion of the sleeve members with one end of the collar engaging the flanges on the sleeve members to force said ribs into firm gripping engagement with the cord covering, said collar being externally threaded and having a flange at the other end extending radially outwardly thereof, and a nut engaged on the threaded portion of the collar whereby the grommet may be secured in an aperture in a panel and the like.

References Cited in the file of this patent

UNITED STATES PATENTS

| Number | Name | Date |
| --- | --- | --- |
| 992,821 | Stewart | May 23, 1911 |
| 1,129,782 | Bissell et al. | Feb. 23, 1915 |
| 1,769,947 | Fullman | July 8, 1930 |
| 1,796,129 | Swanson | Mar. 10, 1931 |
| 2,043,851 | Grant | June 9, 1936 |
| 2,420,826 | Irrgang | May 20, 1947 |
| 2,658,184 | Greenbaum | Nov. 3, 1953 |